366-102 SR
12/16/86 OR RE 32,307

United States Patent [19]
Glatt et al.

[11] E Patent Number: Re. 32,307
[45] Reissued Date of Patent: Dec. 16, 1986

[54] FLUIDIZED BED APPARATUS

[75] Inventors: Werner Glatt, 7851 Binzen, Bühlmühle, Fed. Rep. of Germany; Kurt Bauer, Freiburg-Tiengen, Fed. Rep. of Germany

[73] Assignee: Werner Glatt, Binzen, Fed. Rep. of Germany

[21] Appl. No.: 492,832

[22] Filed: May 9, 1983

Related U.S. Patent Documents

Reissue of:
[64] Patent No.: 4,323,312
Issued: Apr. 6, 1982
Appl. No.: 154,682
Filed: May 30, 1980

U.S. Applications:
[63] Continuation-in-part of Ser. No. 936,955, Aug. 25, 1978, abandoned.

[30] Foreign Application Priority Data

Aug. 26, 1977 [DE] Fed. Rep. of Germany ..... 2738485
Feb. 9, 1978 [DE] Fed. Rep. of Germany ..... 2805397
Feb. 15, 1980 [DE] Fed. Rep. of Germany ..... 3005770

[51] Int. Cl.[4] ..... B01F 13/02; B01F 15/02
[52] U.S. Cl. ..... 366/102; 34/10
[58] Field of Search ..... 34/102, 57 D, 57 A, 34/10; 366/195, 196, 201, 202, 203, 204, 102, 103, 104

[56] References Cited

U.S. PATENT DOCUMENTS

| | | | |
|---|---|---|---|
| 2,761,769 | 9/1956 | Elder | 34/10 |
| 2,851,257 | 9/1958 | Morgan | 366/195 |
| 3,394,468 | 7/1968 | Zeller | 34/57 |
| 3,592,395 | 7/1971 | Lockwood | 34/10 |
| 3,671,296 | 6/1972 | Funakoshi et al. | 427/212 |
| 3,795,058 | 3/1974 | Ganiaris | 34/57 D |
| 3,849,900 | 11/1974 | Dale et al. | 34/10 |
| 3,889,388 | 6/1975 | Oguri et al. | 34/10 |

FOREIGN PATENT DOCUMENTS

| | | | |
|---|---|---|---|
| 1027966 | 4/1958 | Fed. Rep. of Germany | 366/102 |
| 49-26365 | 3/1974 | Japan . | |
| 7107488 | 6/1970 | Netherlands | 34/10 |

*Primary Examiner*—Billy S. Taylor
*Attorney, Agent, or Firm*—Fleit, Jacobson, Cohn & Price

[57] ABSTRACT

Fluidized bed apparatus, comprising a fluidized bed vessel in which a substantially horizontal rotor disc is arranged above a perforated bottom or above an air chamber for rotary movement about an at least approximately vertical axis and for adjustment along said axis. The fluidized bed vessel is tapered upwardly, one portion inwardly and one outwardly to enhance the flow therein and the rotor disc forms a flat cone and the disc may have a central cone with the rotor disc covering at least the central part of the perforated bottom.

* * * * *

The questions raised in reexamination request No. 90/000,329, filed 02/15/83, have been considered and the results thereof are reflected in this reissue patent which constitutes the reexamination certificate required by 35 U.S.C. 307 as provided in 37 CFR 1.570(e).

24 Claims, 6 Drawing Figures

FLUIDIZED BED APPARATUS

Matter enclosed in heavy brackets [ ] appears in the original patent but forms no part of this reissue specification; matter printed in italics indicates the additions made by reissue.

BACKGROUND OF THE INVENTION

This application is a continuation-in-part application of the present inventors' application Ser. No. 936,955 entitled FLUIDIZED BED APPARATUS and filed Aug. 25, 1978, and now abandoned.

The present invention relates to a fluidized bed apparatus, comprising a fluidized bed vessel in which a substantially horizontal rotor disc is arranged above a perforated bottom or above an air chamber for rotary movement about an at least approximately vertical axis and for adjustment along said axis.

The adjustability in height of the rotor disc provides the opportunity to adapt the flow conditions in the fluidized bed vessel in simple manner to various granulating materials and the resulting different operating conditions, regardless of the quantity of circulating air or other gas.

In one embodiment, the fluidized bed vessel is separated from the air chamber by a perforated bottom which prevents material to be granulated or already granulated from falling out of the fluidized bed vessel into the air chamber, irrespective of the position in height of the rotor disc, when the air or other gas stream from the air chamber into the fluidized bed vessel to produce the fluidized bed therein is interrupted, as may become necessary, for instance, for cleaning exhaust air filters disposed above the fluidized bed vessel. Yet the perforated bottom, on the one hand, makes it difficult to clean the entire fluidized bed apparatus, as frequently required above all in pharmaceutical enterprises, all the more so as the space between the rotor disc and the perforated bottom is not readily accessible. Besides, granulating materials may collect in the space between the rotor disc and the perforated bottom during interruptions of operation for the purpose of cleaning the filters, and they may cause uncontrollable flow conditions when the fluidized bed is set into motion again. They may even stick to the walls of the fluidized bed vessel so as to disturb the adjustability in height of the rotor disc.

As is well known, the properties of thorough mixing and heat transfer in fluidized bed apparatus depend largely on the motion of the solids in addition to the formation and movement of bubbles in the fluidized or aerated bed.

Thorough mixing or the prevention of dissociation of the material to be reacted often present great problems, particularly so if the material to be reacted is of varying density and/or varying particle size and/or varying surface characteristics. Very often this is an annoying problem in the preparation of pharmaceutical granulates.

Attempts to solve these problems up to now provided for the use of different built-in structures or pneumatic mixing devices or swinging or oscillating perforated bottoms in fluidized bed reactors.

It has also been attempted to avoid the formation of channels (concentration of the material in narrow channels or tubes) by disposing a star agitator above the perforated bottom, thus improving the fluidized bed motion. However, the star agitator causes practically no centrifugal movement of the material. As with all the other apparatus of the kind known until the present time, the material essentially ascends in the middle and flows down on the outside. In some cases of application, in particular when spraying the material to obtain granulated material, this has the undesired consequence of moist material contacting the wall and easily sticking to the same.

SUMMARY OF THE INVENTION

It is, therefore, an object of the present invention to improve the mixing effect in a fluidized bed apparatus such that the material will flow upwards at the outside and downwards at the inside.

This object is met, in accordance with the invention, in that the fluidized bed vessel is tapered upwardly. This causes the material which is propelled radially outwardly by the rotor disc and then flows upwardly along the inner wall of the fluidized bed vessel to be gradually deflected radially inwardly away from the inner wall so that it will finally flow downwardly in the area of the axis of the fluidized bed vessel to regain the sphere of influence of the rotor disc. The advantages of the invention thus reside in the fact that an essential improvement of the mixing grade in fluidized bed apparatus can be achieved in simple manner. This improvement is of great interest for fluidized bed mixers, dryers, reactors, and granulators alike. The invention has proved especially successful in the preparation of pharmaceutical granulates.

Distance between the perforated bottom and the rotor disc allows the gas flowing upwardly through the perforated bottom to have a component of flow which is directed radially outwards. Flow is further enhanced by the rotor disc forming a flat cone and possibly having a central cone to facilitate the gliding of material off the central area of the rotor disc. Also, the rotor disc covers at least the central part of the perforated bottom thereby largely preventing the fluidized bed from getting under the influence of a strong upwardly directed air current in areas which are remote from the inner wall of the fluidized bed vessel.

In spite of the above, the rotor disc may be perforated because the gas which passes in upward direction through the rotor disc is deflected radially outwardly under any circumstances if the speed of rotation of the rotor disc is sufficiently high.

The deflecting action of the rotor disc on the fluidized bed can be reinforced by mounting attachments in the form of baffle plates or wings or blades on the upper surface of the rotor disc.

The annular gap between the rotor disc and the inner wall of the fluidized bed vessel has a decisive importance on the air velocity in the entire fluidized bed vessel, the extent of which depends upon whether or not and to what extent the rotor disc is perforated. The air velocity in turn is a critical factor in the process and must be adjusted to the optimum value in correspondence with the respective flow properties of the material (diameter and weight of the granulated material). The tapering of the fluidized bed vessel affords the opportunity to improve the fluidized bed apparatus in accordance with the invention such that the flow conditions in the apparatus can be adjusted in a simple manner to different kinds of granulated material, irrespective of the quantity of circulating air or other gas.

This additional advantage is obtained, in accordance with the invention, in that the rotor disc is designed for adjustment in height in the lower conical part of the vessel. The gap between the inner wall of the vessel and the outer edge of the rotor disc then can be reduced by raising the rotor disc. In this way, the air velocity can be increased for a constant amount of air. Furthermore, even a reduction of the air rate is possible and yet, the air velocity can be increased by simultaneous narrowing of the gap. The adjustability in height of the rotor disc thus provides the advantage of always obtaining optimum adaptation of the fluidized bed apparatus to the flow characteristics of the granules. This makes it possible to establish optimum operating conditions for any specific product even by adjustment during operation with a view to the best possible quality of the product.

It is, therefore, another object of the instant invention to develop a fluidized bed apparatus of the kind defined initially such that it will be easier to make it ready for operation again after shutdown.

This object is met, in accordance with the invention, in that an annular seat for the rotor disc is formed in the area of the lower end of the fluidized bed vessel, said rotor disc abutting against the seat in the one end position of its axial adjustment in the manner of a valve body, closing the air chamber toward the top.

Thus, it is possible to close the fluidized bed vessel absolutely tightly toward the bottom, either during filling of the fluidized bed vessel or for short interruptions of operation to clean filters, for instance, by vibration or for emptying the fluidized bed vessel upon completion of a granulating process. Positive pressure can be produced in the air chamber before an annular gap is opened once more between the seat and the rotor disc upon renewed start-up of the apparatus. Thus, it can be prevented positively at any operational condition that granulating material or the finished granules will fall from the fluidized bed vessel into the air chamber.

In particularly useful embodiments of the invention, the rotor disc comprises a sealing cord or sealing ledge secured to the edge of the disc.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
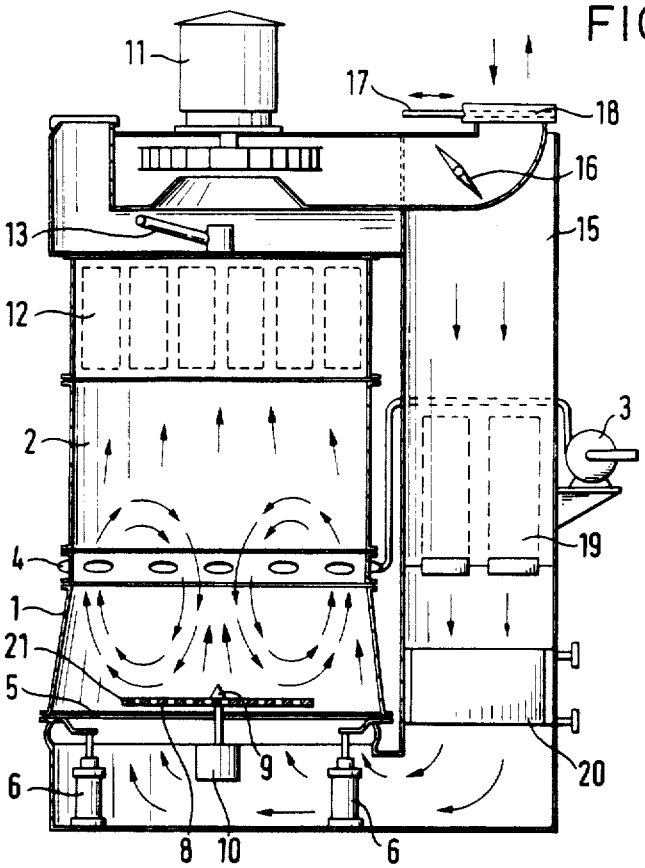
FIG. 1 is a vertical sectional elevation of a fluidized bed apparatus equipped with a perforated rotor disc.

The fluidized bed apparatus as shown in FIG. 1 comprises a fluidized bed vessel 1 which is tapered conically in upward direction and followed by a cylindrical expansion zone 2. A metering pump 3 supplies granulating liquid to the fluidized bed vessel 1 through a nozzle ring 4 between the vessel and the expansion zone 2. At its underside, the fluidized bed vessel 1 is defined by a perforated bottom 5 which may be set into oscillating movement by pneumatic pistons 6. A horizontal perforated rotor disc 8 is spaced above the perforated bottom by from 0.5 to 20 mm and provided in the middle with a central core 9. The rotor disc 8 is adapted to be driven by a motor 10.

A turbine 11 serves to generate air circulation in the fluidized bed apparatus. The air which the turbine 11 sucks from the expansion zone 2 passes through a round filter 12 which is provided with a tilting mechanism 13 for cleaning purposes. A side channel 15 is disposed laterally of the fluidized bed vessel 1, the expansion zone 2, and the round filter 12. Exhaust air and fresh air are adjusted by an exhaust air regulating flap 16 and a fresh air regulator slide 17, respectively, at an air outlet and inlet opening 18. The return air is recycled into the fluidized bed vessel 1 through a prefilter 19 and an air heater 20 in the side channel 15 and then through the perforated bottom 5.

The solid particles of the material contained in the fluidized bed vessel and to be treated, e.g. granulated therein, are conveyed in upward direction by the rising gas or air stream. Subsequently, they fall down inwardly onto the rotor disc 8 under gravity. The centrifugal force generated by the rotor disc 8 propels the solid particles again into the gas or air stream flowing from the bottom to the top. In this way, the uniform revolving or circulating solids movement of the fluidized bed is obtained, as shown in FIGS. 2a and 2b.

Figure 2C:
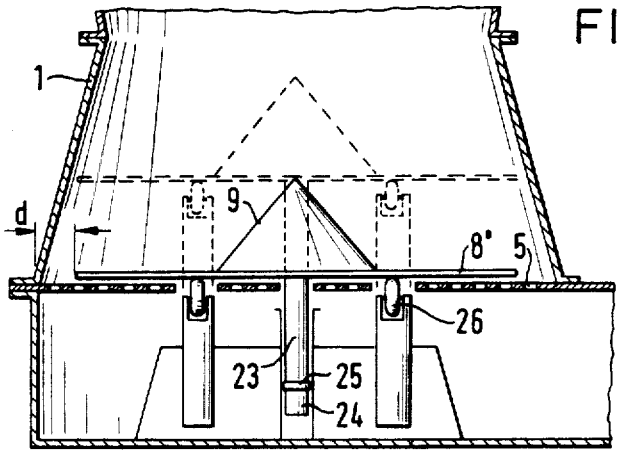
FIGS. 2a to 2c are vertical sectional elevations of three variants of a rotor disc and an upwardly tapering fluidized bed vessel.
Figure 2A:
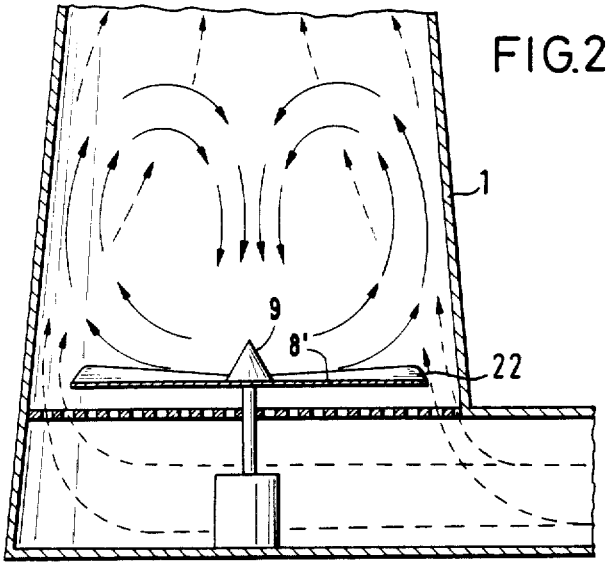
Figure 2B:
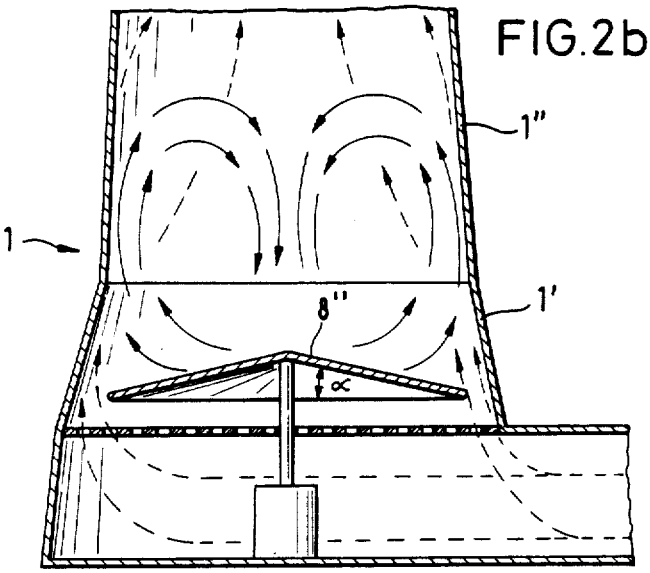

Conical shapes tapering upwardly have proved to be particularly favorable for shape of the fluidized bed vessel, as shown in FIGS. 2a, 2b, and 2c, because with the corresponding sections all of the material flowing in upward direction is deflected inwardly.

The Figures also indicate various embodiments of the rotor disc 8 (8', 8''). In the most simple cases, the rotor discs 8 and 8' are essentially flat, as shown in FIGS. 1, 2a and 2c. However, as shown in FIG. 2b, the rotor disc 8'' may also be inclined outwardly so that it forms a flat cone. The maximum angle of inclination $\alpha$ may be 45°. Preferably, however, the angle of inclination is no more than 20°. It has proved to be advantageous to provide a central zone 9 in the middle of the rotor discs 8 and 8' and to have a slightly outwardly inclined surface of the rotor disc ($\alpha \leqq 15°$). The base area of the central cone 9 normally has a diameter which corresponds to from 15 to 50%, preferably from 15 to 30% of the diameter of the rotor disc 8 or 8', while the height of the cone is between 5 and 50%, preferably from 10 to 30% based on the rotor disc diameter. The surface proportion of the rotor disc should be from about 20 to 95%, preferably from 60 to 80% of the base area of the fluidized bed apparatus.

It is the purpose of the perforations 21 in rotor disc 8, which may be gathered from the drawings, to let a certain proportion of the air or gas stream flow to the top also in the center of the fluidized bed vessel 1.

In special cases, attachments 22 in the form of baffle plates or wings or blades may be mounted on the rotor discs 8 or 8', as illustrated in FIG. 2a.

The speed of rotation of the rotor disc 8 (8', 8'') is to be from 20 to 1000, preferably from 40 to 150 r.p.m. so as to generate a sufficiently great centrifugal force.

In the embodiment according to FIG. 2c, the rotor disc 8' is supported for adjustment in height by means of an insertable shaft 23 supported through the intermission of an axial bearing 25 on a piston 24 of a pneumatic piston and cylinder unit to effect the raising and lowering. The rotor disc 8 may also be supported on guide rollers or ball bearings 26 spaced from the shaft 23 and likewise adapted to be raised and lowered by pneumatic lifting devices. Piston 24 and also rollers or bearings 26 may be raised or lowered during operation and rotation of rotor disc 8' in order to determine and obtain optimum operating conditions. As shown in FIG. 2c, the gap d between the outer edge of the rotor disc and the inner wall of the fluidized bed vessel is narrowed as the rotor disc 8' is raised. This also holds true for rotor discs 8, 8' and 8'' in FIGS. 1, 2a, and 2b, respectively.

Figure 3:
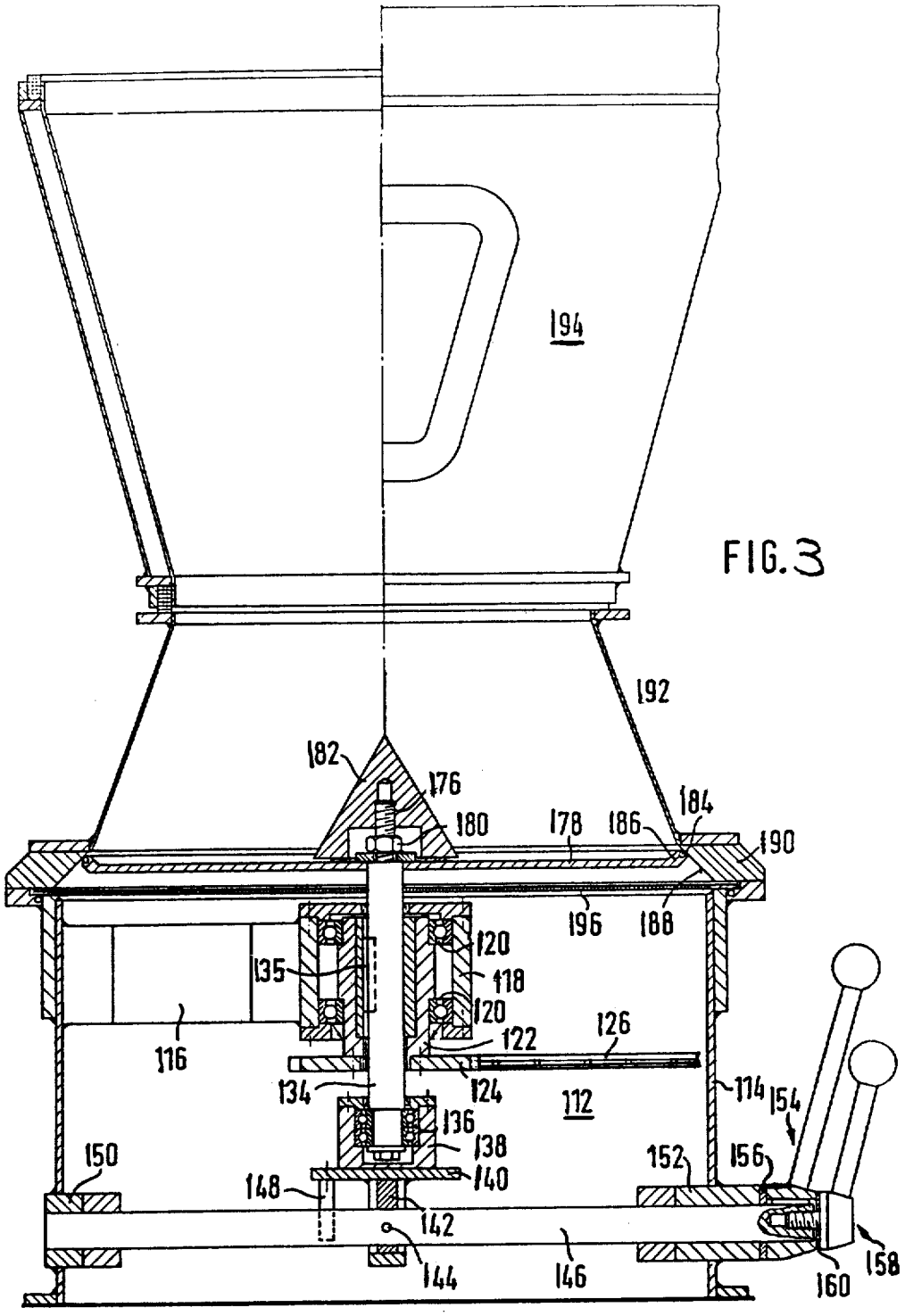
FIG. 3 is a vertical axial sectional elevation of a further embodiment of a fluidized bed apparatus with a fluidized bed vessel which narrows frustoconically in its lower portion and widens frustoconically in its upper portion.
Figure 4:
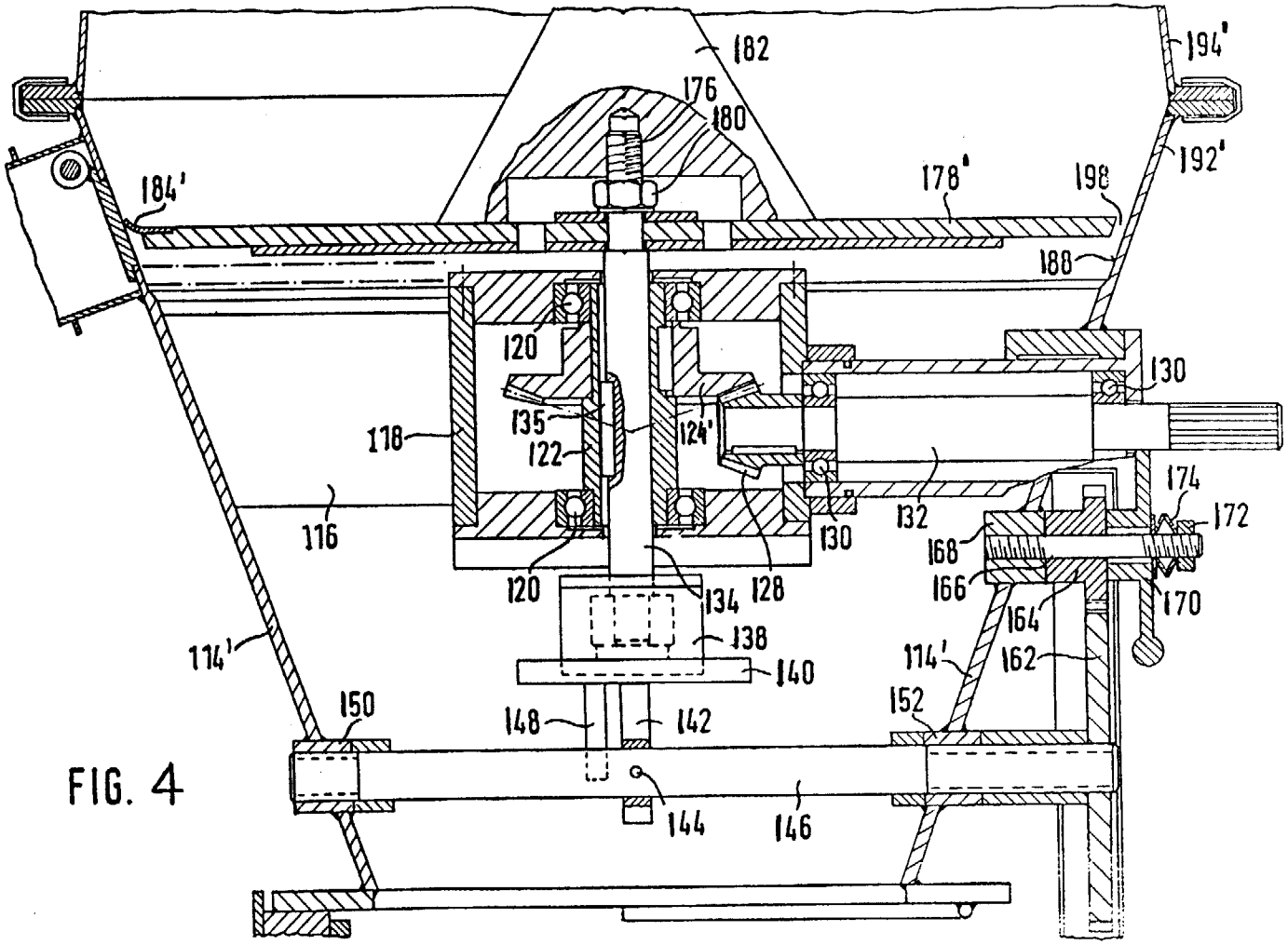
FIG. 4 is also a vertical axial sectional elevation of still another embodiment of a fluidized bed apparatus with a fluidized bed vessel which widens frustoconically upwardly in its lower portion and narrows frustoconically in its upper portion.

The fluidized bed apparatus shown in FIG. 3 and FIG. 4 includes an air chamber 112 which is enclosed by a cylindrical wall 114 according to FIG. 3 and by a conically upwardly flaring wall 114' according to FIG. 4.

Three radial arms 116 carrying a bearing casing 118 are fixed at angular spacings of 120° to the wall 114, 114'. A sleeve 122 is supported for rotation, yet axially fixed by two roller bearings 120 in the bearing casing 118. According to FIG. 3, a sprocket wheel 124 is attached to the sleeve 122, whereas it is a bevel gear 124' according to FIG. 4. The sprocket wheel is adapted to be driven by way of a chain 126, preferably at infinitely variable speed, from an electric motor (not shown) secured to the wall 114. In corresponding manner, the bevel gear 124' is adapted to be driven by a bevel pinion 128 and a shaft 132 supported in roller bearings 130 and arranged radially with respect to the wall 114', from an electric motor likewise not shown in FIG. 4.

With both embodiments according to FIGS. 3 and 4, a rotor shaft 134 is guided for axial displacement, i.e., in vertical direction in the sleeve 122. A key 135 disposed as torque transmitting element between the sleeve 122 and the rotor shaft 134 warrants that the two can only rotate together. The lower end of the rotor shaft 134 is supported in another axially loadable roller bearing pair 136 in a casing 138 which is supported by an affixed horizontal plate 140 on the circumferential surface of an eccentric disc 142 secured by a clamping sleeve 144 on a horizontal adjuster shaft 146. A pair of pins 148 are secured to the plate 140 so as to straddle the shaft 146 like a fork, whereby plate 140 and casing 138 are prevented from rotating together with the rotor shaft 134. The horizontal adjuster shaft 146 in turn is held axially fixed in bearing bushings 150 and 152 fixed to wall 114 or 114', respectively, diametrically opposite each other.

The fluidized bed apparatus according to FIG. 3 is so designed that the adjuster shaft 146 is rotatable by an adjuster clamp handle 154 which is axially displaceably arranged at one end of the shaft projecting out of the bearing bushing 152 through the intermission of a friction disc 156. A tensioning clamp handle 158 is provided to clamp the adjuster shaft 146 in a selected angle of rotation position. There is a threaded connection between the tensioning clamp handle 158 and one end of the adjuster shaft, and the tensioning clamp handle 158 is supported at the end face of the adjuster clamp handle 154 remote from the first friction disc 156, through the intermission of a second friction disc 160. By rotating and subsequently clamping the adjuster shaft 146, the rotor shaft 134 can be adjusted in vertical direction and then kept at the desired level.

A similar effect can be achieved with the fluidized bed apparatus according to FIG. 4 in that a gear 162 is secured on the adjuster shaft 146 and meshes with a pinion 164 on a countershaft 166 which in turn is supported in a bushing 168 fixed to the wall 114'. A handwheel 170 is connected with the countershaft 166 for common rotation. The countershaft 166 can be clamped in a selected angle of rotation position by means of a nut 172 threaded on the shaft and supported on the handwheel 170 through the intermission of cup springs 174. In this manner, the rotor shaft 134 may be retained in a selected elevation with the fluidized bed apparatus according to FIG. 2 as well.

With both fluidized bed apparatus according to FIGS. 3 and 4, a threaded pin 176 is formed at the upper end of the rotor shaft 134 to receive a rotor disc 178 or 178' which is clamped tight by a nut 180. Furthermore, a cone 182 is screwed on the threaded pin 176 to press with its basis on the rotor disc 178.

According to FIG. 3, an annular sealing cord 184 is fixed at the outer edge of the rotor disc 178 and embedded with approximately half its circular cross-section in an annular collar 186 of the rotor disc. Instead of a sealing cord 184, a flat annular sealing ledge 184' is fixed at the outer edge of the rotor disc 178', for instance, by gluing, according to FIG. 4.

In both embodiments according to FIGS. 3 and 4, an annular seat 188 is provided around the rotor disc 178 or 178'. According to FIG. 3, it is formed at an independent, axially symmetrical structural element 190, screw connected with the wall 114, and tapers frustoconically in upward direction. According to FIG. 4, on the other hand, it is formed in the wall 114' itself and widens frustoconically in upward direction.

Above the annular seat 188, both embodiments include a frustoconical lower member 192 or 192' of a fluidized bed vessel 192, 194, or 192', 194' formed integrally or connected by flanges. In the case of the embodiment according to FIG. 3, this lower member tapers upwardly, while it is widened upwardly in the embodiment according to FIG. 4. An upper member 194, likewise of frustoconical shape, of the fluidized bed vessel 192, 194 is flanged to the lower member 192 and widens upwardly according to FIG. 3, while member 194' narrows upwardly according to FIG. 4.

The fluidized bed apparatus shown in FIG. 3 comprises a perforated bottom 196 below the rotor disc 178' as the upper limit of the air chamber 112 and clamped between an annular upper end face of the wall 114 and the annular structural member 190. The fluidized bed apparatus according to FIG. 4 does not comprise such a perforated bottom so that the air chamber 112 can be closed at the top only by the rotor disc 178'.

The rotor disc 178 is shown in FIG. 3 in its upper end position in sealing engagement against seat 188 by means of its sealing cord 184. By rotating the adjuster shaft 146, the rotor disc 178 may be lowered more or less out of its upper end position until close to the perforated bottom 196 so that a more or less wide annular gap is formed between the outer edge of the rotor disc 178 and the seat 188.

The opposite happens with the fluidized bed apparatus shown in FIG. 4: In its upper end position, shown in continuous lines, the rotor disc 178' leaves an annular gap 198 between itself and the lower member 192' of the fluidized bed vessel 192', 194'. From this upper end position, the rotor disc may be lowered into a lower end position in which it is indicated in discontinuous lines at the left of FIG. 4 and in which it closely abuts the seat 188 with its outer edge. According to FIG. 4, the annular sealing lege 184' may be made of a yielding, low-friction material like polytetrafluoroethylene and so dimensioned that it will engage the lower member 192' of the fluidized bed vessel 192', 194' even with the rotor disc 178' in its upper end position. Yet this engagement will be at such little pressure that the sealing ledge will act like a flap valve and pern.it air or other gas flow from the air chamber 112 into the fluidized bed vessel 192', 194' without giving any processed material contained in the fluidized bed vessel a chance to fall into the air chamber 112. As the rotor disc 178' is lowered, the pressure increases under which the sealing ledge 184' abuts against the lower member 192' of the fluidized bed vessel until the rotor disc 178' rests firmly on the seat 188, thus interrupting any flow from the air chamber 112 into the fluidized bed vessel 192', 194'.

It will be obvious to those skilled in the art that various changes may be made without departing from the scope of the invention and the invention is not to be considered limited to what is shown in the drawings and described in the specification.

What is claimed is:

1. A fluidized bed apparatus comprising:

[a fluidized bed vessel] *in three vertically contiguous sections, an upper section constituting an expansion zone, an intermediate section* having *a first* [walls tapered inwardly as it extends] *wall extending* upwardly, *and a lower section including a second wall tapered inwardly frustoconically as it extends downwardly* and [having a perforated] *terminating in a* bottom [,] *inlet for air, or other gas, said intermediate and lower sections constituting a fluidized bed vessel, with said second wall having an interior wall surface, said interior wall surface being divided into an upper portion and a lower portion, said upper portion being defined in the area of vertical movement of a rotor disc, said upper portion widening frustoconically in an upward direction;* a substantially horizontal rotor disc *having a substantially flat bottom and being arranged for vertical movement, said rotor disc* arranged above said bottom *inlet of said vessel* [,] *and below the top of said lower section and in radial proximity with said upper portion of said interior wall surface of said lower section;* said rotor disc being of smaller horizontal dimension than the [corresponding] horizontal dimension *of the top of said lower section* of *said interior wall surface of* said vessel [and] *but of larger horizontal dimension than the horizontal dimension of the bottom inlet of said lower section, and said rotor disc* forming an annular gap between the circumferential edge of said rotor disc and [the] *said* upwardly and [inwardly tapered] *outwardly frustoconically widening* [wall] *upper portion* of said *lower section of said* vessel [,];

*adjusting* means for adjusting the *vertical* height of said rotor disc connected to said rotor disc and thereby changing the width of said annular gap [,] *relative to the upper portion of said lower section from zero gap at the lowest position to a predetermined gap at the highest position of the rotor disc;* means for rotating said rotor disc about an at least approximately vertical axis connected to said rotor disc [,];

*sucking* means *positioned above and in fluid communication with said upper section* for [moving] *sucking* a flow of air or other gas into said vessel through said bottom *inlet* and through said annular gap around the periphery of said rotor disc [,] *so that the flow of air or other gas tends to follow the outwardly widening wall surface of the lower section;*

*said adjusting means closing of said annular gap to cause said sucking means to create a pressure differential between the portion of said fluidized vessel on one side of said rotor disc and the remaining portion of said vessel on the other side of said rotor disc when said sucking means is operating;* means for releasing material to be treated into the *fluidized bed vessel above said rotor disc to form* [moving gas forming] a fluidized bed moved by said rotor disc and the [moving] gas [passing] *being sucked* through said annular gap [,]; *and*

*nozzle means for introducing liquid into said fluidized bed vessel, said nozzle means including a plurality of nozzles disposed in a ring about the periphery of said vessel below said expansion zone;* whereby the velocity of the flow of gas through said annular gap [is] *may be* adjusted to the varying density, particle size, and surface characteristics of the material to be treated by varying the height of said rotor disc in relation to said [walls] *upper portion of said interior walls* of said vessel to decrease said gap and increase flow velocity and alternatively to increase said gap and decrease flow velocity.

[2. The fluidized bed apparatus as claimed in claim 1, characterized in that the distance between said perforated bottom and said rotor disc is in the range from 0.5 to 20.0 mm.]

[3. The fluidized bed apparatus as claimed in claim 2, further characterized by the base area of said rotor disc amounting to from 60 to 80% of the area of the bottom of said fluidized bed vessel.]

4. The fluidized bed apparatus as claimed in claim 1, further characterized by said rotor disc being a shallow cone having an angle of inclination not exceeding 45°.

5. The fluidized bed apparatus as claimed in claim 1, further characterized by said rotor disc having a central cone, said central cone having a base area diameter amounting to from 15 to 50% of the diameter of said rotor disc and a height amounting to from 5 to 50% of the diameter of said rotor disc.

[6. The fluidized bed apparatus as claimed in claim 5, further characterized by the base area of said rotor disc amounting to from 60 to 80% of the area of the bottom of said fluidized bed vessel.]

[7. The fluidized bed apparatus as claimed in claim 1, further characterized by the base of said rotor disc amounting to from 60 to 80% of the area of the bottom of said fluidized bed vessel.]

8. The fluidized bed apparatus as claimed in claim 1, further characterized by attachment means to increase centrifugal and upward flow in the fluidized bed, attached on the upper side of said rotor disc.

9. The fluidized bed apparatus as claimed in claim 8, further characterized by said attachment means being baffle plates.

10. The fluidized bed apparatus as claimed in claim 8, further characterized by said attachment means being blades.

[11. The fluidized bed apparatus as claimed in claim 1, further characterized by said fluidized bed vessel including two sections disposed one above the other, the lower of said sections together with said rotor disc defining said annular gap and being more tapered inwardly as it extends upwardly than the upper of said sections.]

12. The fluidized bed apparatus as claimed in claim 1, further characterized by said means for adjusting the height of said rotor disc including piston means attached to said rotor disc for vertical reciprocating motion.

[13. The fluidized bed apparatus as claimed in claim 12, further characterized by said means for adjusting the height of said rotor disc further including vertically adjustable guide means supporting the underside of said rotor disc.]

14. The fluidized bed apparatus as claimed in claim 1, further characterized by

[said source of air including]

means to exhaust air from said fluidized bed vessel, [and] regulating means in the path of air exhausted from said vessel *means to draw air into said vessel from the outside and to pass same through said bottom, and means* to regulate the amount of air entering from outside said vessel and passing through said [perforated] bottom [with said air exhausted from said vessel].

15. The fluidized bed apparatus as claimed in claim 1, further characterized by said means for adjusting the height of said rotor disc also being operable during rotation of said rotor disc.

[16. A fluidized bed apparatus comprising a fluidized bed vessel, an annular seat formed in said vessel, an annular seat formed in said vessel, a substantially horizontal rotor disc arranged within said vessel, said rotor disc forming an annular gap between the circumferential edge of said rotor disc and said annular seat, means for adjusting the height of said rotor disc connected to said rotor disc and thereby changing the width of said annular gap, means for rotating said rotor disc about an at least approximately vertical axis connected to said rotor disc, means for moving a flow of air or other gas into said vessel beneath said rotor disc and through said annular gap around the periphery of said rotor disc, means for releasing material to be treated into said vessel above said rotor disc, said material forming a fluidized bed moved by said rotor disc and the moving gas passing through said annular gap.]

17. The fluidized bed apparatus as claimed in claim [16] *1*, wherein said means for adjusting the height of said rotor disc are adapted to move the rotor disc in an abutting engagement with said [annular seat] *upper portion* thus closing said annular gap.

[18. The fluidized bed apparatus as claimed in claim 16 wherein said vessel has a wall portion tapered inwardly as it extends upwardly, said wall portion surrounding said rotor disc, said annular seat being arranged at said wall portion.]

[19. The fluidized bed apparatus as claimed in claim 16, wherein said vessel has a wall portion tapered inwardly as it extends downwardly, said wall portion surrounding said rotor disc, said annular seat being arranged at said wall portion.]

20. The fluidized bed apparatus as claimed in [claim 18 or] claim [19] *1*, wherein said rotor disc comprises a sealing means fixed along its circumferential edge.

*21. The fluidized bed apparatus as claimed in claim 1, further characterized by*

*the means for sucking a flow of air or other gas comprising a fan mounted downstream of the upper section of the fluidized bed vessel to suck air or other gas from said upper section.*

*22. The fluidized bed apparatus as claimed in claim 21, further characterized by*

*filter means interposed between the fan and the upper section of the fluidized bed.*

*23. The fluidized bed apparatus as claimed in claim 21 wherein the fan exhausts to the outside via a regulating flap and fresh air is sucked into the bottom of said vessel through a regulated inlet.*

*24. The fluidized bed apparatus of claim 1, further comprising regulating means for regulating the volume of air passing through said vessel.*

* * * * *